United States Patent
Chen et al.

(10) Patent No.: US 9,609,611 B2
(45) Date of Patent: *Mar. 28, 2017

(54) METHOD, BASE STATION, AND BROADCAST MULTICAST SERVICE CENTER FOR CREATING, UPDATING, AND RELEASING SYNCHRONIZATION ENTITIES

(71) Applicant: Alcatel Lucent, Boulogne Billancourt (FR)

(72) Inventors: Yu Chen, Shanghai (CN); He Wang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,781

(22) Filed: Oct. 20, 2014

(65) Prior Publication Data

US 2015/0036583 A1 Feb. 5, 2015

Related U.S. Application Data

(63) Continuation of application No. 13/318,105, filed as application No. PCT/CN2009/000473 on Apr. 29, 2009, now Pat. No. 8,867,424.

(51) Int. Cl.
*H04H 20/71* (2008.01)
*H04W 56/00* (2009.01)
(Continued)

(52) U.S. Cl.
CPC ......... *H04W 56/002* (2013.01); *H04L 12/189* (2013.01); *H04L 67/1095* (2013.01);
(Continued)

(58) Field of Classification Search
CPC ..................................................... H04W 4/06
(Continued)

(56) References Cited

U.S. PATENT DOCUMENTS 6,996,077 B1 * 2/2006 Suenaga et al. ............. 370/320
7,664,467 B2   2/2010 Cheng et al.
(Continued)

FOREIGN PATENT DOCUMENTS

CN   101247315 A    8/2008
EP     1978762 A1   10/2008
(Continued)

OTHER PUBLICATIONS

3GPP TS 25.346 V8.3.0, "Introduction of the Multimedia Broadcast Multicast Service (MBMS) in the Radio Access Network (RAN); Stage 2," Mar. 1009.
(Continued)

*Primary Examiner* — Wei Zhao
(74) *Attorney, Agent, or Firm* — Fay Sharpe, LLP (57) ABSTRACT

The present invention provides processes of creating, updating, and releasing SYNC entities between eNB and BM-SC, and an eNB and a BM-SC for implementing the processes of creating, updating, and releasing the SYNC entities. According to a solution of the present invention, a method of creating SYNC entities is provided, including: creating, at a BM-SC, a plurality of SYNC entities whose amount is equal to the total amount of services, and associating the created plurality of SYNC entities with the services in a one-to-one correspondence manner; sending a SYNC entity creating instruction to all eNBs within an MBSFN area; creating, at each eNB, a plurality of SYNC entities whose amount is equal to the total amount of services based on the received SYNC entity creating instruction, and associating the created plurality of SYNC entities with the services in a one-to-one correspondence manner.

9 Claims, 7 Drawing Sheets (51) Int. Cl.
*H04L 12/18* (2006.01)
*H04L 29/08* (2006.01)
*H04W 4/06* (2009.01)
*H04W 88/08* (2009.01)
*H04W 88/18* (2009.01)

(52) U.S. Cl.
CPC .............. *H04W 56/00* (2013.01); *H04W 4/06* (2013.01); *H04W 88/08* (2013.01); *H04W 88/18* (2013.01)

(58) Field of Classification Search
USPC ........................................................ 370/312
See application file for complete search history.

(56) References Cited

U.S. PATENT DOCUMENTS

| | | | |
|---|---|---|---|
| 8,159,986 B2 | 4/2012 | Yun et al. | |
| 2005/0198126 A1* | 9/2005 | Verbestel | 709/204 |
| 2008/0016248 A1* | 1/2008 | Tsirtsis et al. | 709/248 |
| 2010/0208603 A1* | 8/2010 | Ishii | 370/252 |

FOREIGN PATENT DOCUMENTS

| | | |
|---|---|---|
| KR | 100774365 B1 | 11/2007 |
| KR | 10-2009-0016024 | 2/2009 |
| WO | WO 2008/024214 | 2/2008 |

OTHER PUBLICATIONS

3GPP TSG-RAN 3#53bis, Seoul Korea, NTT DoCoMo, Content Synchronization by Absolute Time Stamp in BM-SC, R3-061474, Oct. 10-13, 2006.
3GPP TS 36.300 V8.0.0, "Evolved Universal Terrestrial Radio Access (E-UTRA) and Evolved Universal Terrestrial Radio Access Network (E-UTRAN)," Stage 2, Mar. 2007.
3GPP TSG SA WG2 Architecture. S2#46, S2-051416, "Corrections," Vodafone, May 9-13, 2005, Athens, Greece, pp. 1-19.
3GPP TSG-RAN WG3 #63bis, R3-090744, "Way forward for eMBMS in Rel9", Seoul, Korea, Mar. 23-26, 2009, pp. 1-4.
3GPP TSG-RAN3 Meeting #64, R3-091100, "eMBMS Stage 2 description," San Francisco, California, USA, May 4-8, 2009, pp. 1-8.
3GPP TSG-RAN WG3 Meeting #53bis, R3-061583, "Text Proposal 'Architecture for Content Synchronisation' ", Alcatel, NTT DoCoMo, Nokia, . . . , Seoul, Korea, Oct. 10-13, 2006, pp. 1-7.

* cited by examiner

METHOD, BASE STATION, AND BROADCAST MULTICAST SERVICE CENTER FOR CREATING, UPDATING, AND RELEASING SYNCHRONIZATION ENTITIES

This application claims priority to and is a Continuation of U.S. application Ser. No. 13/318,105, filed Oct. 28, 2011, entitled METHOD, BASE STATION, AND BROADCAST MULTICAST SERVICE CENTER FOR CREATING, UPDATING, AND RELEASING SYNCHRONIZATION ENTITIES, by Yu Chen, the disclosure of which is incorporated herein by reference in its entirety, which is a U.S. National Stage entry of International Application No. PCT/CN2009/000473 (International Filing Date of Apr. 29, 2009).

FIELD OF THE INVENTION

The present invention relates to the mobile communication field, and more particularly, relates to processes of creating, updating, and releasing SYNC (synchronization) entities between an eNB (base station) and a BM-SC (Broadcast Multicast Service Center), as well as an eNB and a BM-SC for implementing the above processes of creating, updating, and releasing the SYNC entities.

DESCRIPTION OF THE RELATED ART

SYNC entities are disposed peer-to-peer in eNB and BM-SC for guaranteeing content synchronization between the two SYNC entities. However, how to configure SYNC entities is still a pending issue. When considering configuration of SYNC entities, the following two facts should be noted: (1) 3GPP has generally acknowledged a statistical service multiplexing solution in which a plurality of services may be clustered or grouped and the service cluster or service group may be regarded as a virtual large service, thereby realizing simplification; and (2) one cell only belongs to one MBSFN (Multimedia Broadcast Multicast Single Frequency Network) area, and all cells in one MBSFN area transmit the same service.

Based on the above consideration, the present invention provides a set of technical solutions regarding SYNC entity configuration structures.

SUMMARY OF THE INVENTION

The present invention provides novel processes of creating, updating, and releasing SYNC entities between an eNB and a BM-SC, as well as an eNB and a BM-SC for implementing the above processes of creating, updating, and releasing the SYNC entities.

According to a first aspect of the present invention, a method of creating SYNC entities is provided, including: creating, at a BM-SC, a plurality of SYNC entities whose amount is the same as the total amount of services, and associating the created plurality of SYNC entities with the services in a one-to-one correspondence manner; sending an SYNC entity creating instruction to all eNBs within an MBSFN area; creating, at each eNB, a plurality of SYNC entities whose amount is equal to the total amount of services based on the received SYNC entity creating instruction, and associating the created plurality of SYNC entities with the services in a one-to-one correspondence manner.

Preferably, the SYNC entity creating instruction includes total amount of services, service identification information and service start indication.

According to the first aspect of the present invention, a method of updating SYNC entities is further provided, including: creating, at a BM-SC, a new SYNC entity when a new service starts, and associating the created new SYNC entity with the new service in a one-to-one correspondence manner; sending an SYNC entity updating instruction to all eNBs within an MBSFN area; creating, at each eNB, a new SYNC entity based on the received SYNC entity updating instruction, and associating the created new SYNC entity with the new service in a one-to-one correspondence manner.

Preferably, the SYNC entity updating instruction includes service identification information and service start indication.

According to the first aspect of the present invention, a method of releasing SYNC entities is further provided, including: releasing, at a BM-SC, when an original service terminates, an SYNC entity associated with the original service; sending an SYNC entity releasing instruction to all eNBs within an MBSFN area; releasing, at each eNB, an SYNC entity associated with the original service based on the received SYNC entity releasing instruction.

Preferably, the SYNC entity releasing instruction includes service identification information and service termination indication.

According to a second aspect of the present invention, a method of creating SYNC entities is provided, including: creating, at a BM-SC, a plurality of SYNC entities whose amount is equal to the total amount of service groups, and associating the created plurality of SYNC entities with the service groups in a one-to-one correspondence manner; sending an SYNC entity creating instruction to all eNBs within an MBSFN area; creating, at each eNB, a plurality of SYNC entities whose amount is equal to the total amount of service groups based on the received SYNC entity creating instruction, and associating the created plurality of SYNC entities with the service groups in a one-to-one correspondence manner.

Preferably, the SYNC entity creating instruction includes total amount of services, service grouping information and service start indication.

Preferably, the SYNC entity creating instruction includes total amount of services, service identification information and service start indication, and at the BM-SC, data packets of each service are buffered and restructured.

According to the second aspect of the present invention, a method of updating SYNC entities is further provided, including: first determining, at a BM-SC, when a new service starts, whether the new service belongs to an existing service group; when the new service does not belong to any existing service, creating a new SYNC entity, and associating the created new SYNC entities with the new service in a one-to-one correspondence manner; sending an SYNC entity updating instruction to all eNBs within an MBSFN area; first determining, at each eNB, whether the new service belongs to an existing service group based on the received SYNC entity updating instruction; when the new service does not belong to any existing group, creating a new SYNC entity, and associating the created new SYNC entity with the new service in a one-to-one correspondence manner.

Preferably, the SYNC entity creating instruction includes service identification information, service grouping information and service start indication.

Preferably, the SYNC entity creating instruction includes service identification information and service start indication, and at the BM-SC, data packets of each service are buffered and restructured.

Preferably, the method of updating SYNC entities further includes: at the BM-SC, when the new service belongs to an existing service group, directly sending the SYNC entity updating instruction to all eNBs within an MBSFN area; and at each eNB, when the new service belongs to an existing service group, directly terminating the SYNC entity updating processing.

According to the second aspect of the present invention, a method of releasing SYNC entities is further provided, including: determining, at a BM-SC, when an original service terminates, whether the original service is the last service in the service group to which it belongs; releasing, when the original service is the last service in the service group to which it belongs, an SYNC entity that is associated with the service group; sending an SYNC entity releasing instruction to all eNBs within an MBSFN area; determining, at each eNB, whether the original service is the last service in the service group to which it belongs based on the received SYNC entity releasing instruction; when the original service is the last service in the service group to which it belongs, releasing an SYNC entity that is associated with the service group to which it belongs.

Preferably, the SYNC entity releasing instruction includes service identification information, service grouping information and service termination indication.

Preferably, the SYNC entity releasing instruction includes service identification information and service termination indication, and at the BM-SC, data packets of each service are buffered and restructured.

Preferably, the SYNC entity releasing method further includes directly sending, at the BM-SC, when the original service is not the last service in the service group to which it belongs, an SYNC entity releasing instruction to all eNBs within the MBSFN area; and directly terminating the SYNC entity releasing process, at each eNB, when the original service is not the last service in the service group to which the original service belongs.

According to a third aspect of the present invention, a method of creating SYNC entities is provided, including: creating or statically configuring a single SYNC entity at a BM-SC; sending an SYNC entity creating instruction to all eNBs within an MBSFN area; and creating, at each eNB, a single SYNC entity based on the received SYNC entity creating instruction.

Preferably, the SYNC entity creating instruction includes service identification information, service grouping information and service start indication.

Preferably, the SYNC entity creating instruction includes service identification information and service start indication, and at the BM-SC, data packets of each service are buffered and restructured.

Preferably, the SYNC entity creating method further includes sending the SYNC entity updating instruction from the BM-SC to all eNBs within the MBSFN area.

Preferably, the SYNC entity updating instruction includes service identification information, service grouping information and service start indication; or the SYNC entity updating instruction includes service identification information, service grouping information and service termination indication.

Preferably, the SYNC entity updating instruction includes service identification information and service start indication, or the SYNC entity updating instruction includes service identification information and service termination indication, and at the BM-SC, data packets of each service are buffered and restructured.

According to a fourth aspect of the present invention, a BM-SC is provided, including: an SYNC entity creating unit configured to create SYNC entities; an SYNC entity associating unit configured to associate the created SYNC entities with services or service groups; and an instructing unit configured to send an SYNC entity creating instruction or an SYNC entity updating instruction to all eNBs within an MBSFN area.

Preferably, the BM-SC further includes a service initiating/terminating unit configured to determine whether a new service starts or an original service terminates; and an SYNC entity releasing unit configured to release an SYNC entity based on a service or a service group, wherein when it is determined that a new service starts, the service initiating/terminating unit instructs the SYNC entity creating unit to create SYNC entities, and when it is determined that an original service terminates, the service initiating/terminating unit instructs the service SYNC entity releasing unit to release the SYNC entity, and the instructing unit is further configured to send an SYNC entity releasing instruction to all eNBs within the MBSFN area.

Preferably, the SYNC entity creating unit creates SYNC entities based on services or service groups.

According to a fifth aspect of the present invention, an eNB is provided, including: a receiving unit configured to receive an SYNC entity creating instruction or an SYNC entity updating instruction from a BM-SC; an SYNC entity creating unit configured to create SYNC entities; an SYNC entity associating unit configured to associate the SYNC entities created by the SYNC entity creating unit with services or service groups.

Preferably, the receiving unit is further configured to receive an SYNC entity releasing instruction from the BM-SC, and the eNB further includes an SYNC entity releasing unit configured to release an SYNC entity based on a service or a service group.

Preferably, the SYNC entity creating unit creates SYNC entities based on services or service groups.

According to the above alternative aspects of the present invention, the problem regarding configuring SYNC entities will be successfully resolved. However, these solutions have their own advantages and drawbacks (see detailed analysis in the Preferred Embodiments). In system application and configuration, those skilled in the art may select an appropriate solution as required.

BRIEF DESCRIPTION OF THE DRAWINGS

Based on the following detailed description on the non-limiting embodiments of the present invention in conjunction with the drawings, the above and other objectives, features and advantages of the present invention will become more apparent, wherein.

DETAILED DESCRIPTION OF THE INVENTION

Hereinafter, the present invention will be described with reference to the drawings. In the following description, some specific embodiments are only for illustrative purposes and they should not be understood as any limitation to the present invention, but are only examples. When traditional structures of architecture will potentially cause ambiguities on the understanding of the present invention, they will be omitted.

In the present invention, the preconditions for MBMS (Multimedia Broadcast Multicast Service) are that each cell only belongs to one MBSFN area and no overlap exists between MBSFN areas. Thus, all cells within one MBSFN area have a same service profile, radio configuration, and a same IP multicast destination. Based on the above preconditions, network deployment and relevant technical solution will become much simpler. In this case, it needs to consider the problem of how to configure SYNC entities. The underlined reason is that when transferring services, some services might be multiplexed together, such as the services that require the same SDU (Service Data Packet) Packet Error Rate (PER), while some other services will not be multiplexed together. Different SYNC entity configuration solutions may influence the complexity of SYNC protocol and system.

A pair of peer-to-peer SYNC entities guarantees content synchronization for data therebetween. In the case of service multiplexing, a plurality of services are associated with each other based on byte counting and packet counting, particularly in the case of packet loss at a service switching point. Thus, synchronization of one service would affect other services that are multiplexed therewith. In this case, SYNC entities also become associated with each other. According to the present invention, the following three embodiments are provided. However, the scope of the present invention should not be limited to the specific description of these embodiments, but should cover all equivalent technical solutions that may be contemplated by those skilled in the art through reading these specific descriptions.

Embodiment 1

Each Service with a Corresponding SYNC Entity

Figure 1A:
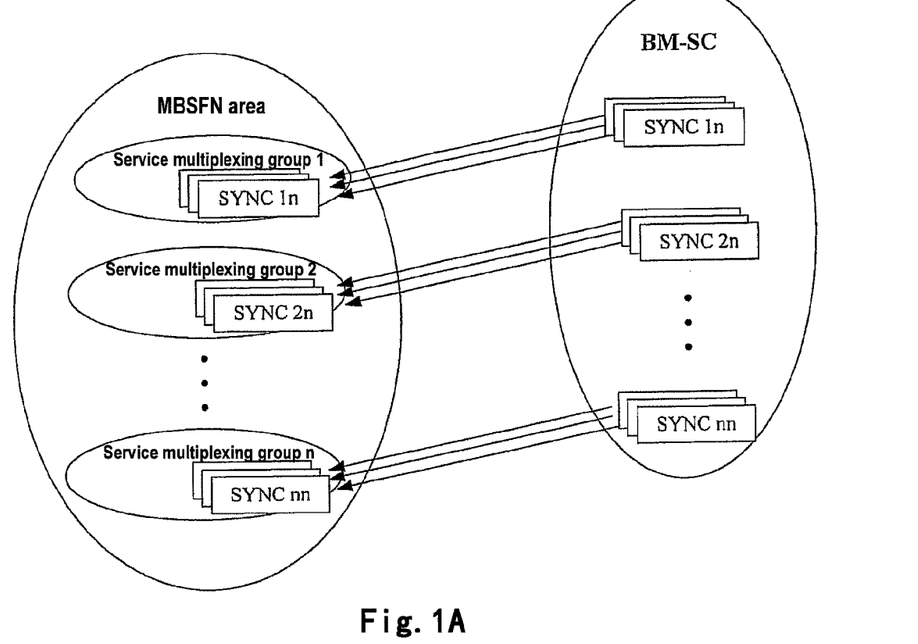
FIG. 1A illustrates a diagram of Embodiment 1 where each service has a corresponding SYNC entity.

FIG. 1A illustrates a diagram of Embodiment 1 where each service has a corresponding SYNC entity.

As illustrated in FIG. 1A, Embodiment 1 is the most direct solution. In this case, SYNC entities are related to services. Upon the initiation or termination of services, SYNC entities will be created or released. Because packet counting and byte counting are independently performed for each service, in the case packet loss occurs in a service multiplexing group, it may be clearly determined which service or services will be affected by the packet loss. From this perspective, when processing a problem of packet loss at a service transmission switching point, Embodiment 1 has an inherent robustness.

Generally, the advantages and drawbacks of Embodiment 1 are specified as below:

Advantages:
Simple and intuitive;
Because the services that are affected by the packet loss may be identified clearly, it has a good defensiveness against the packet loss problem in multiplexed services.

Drawbacks:
Compared with other embodiments of the present invention, it is too frequent in creating and releasing SYNC entities.

Figure 1B:
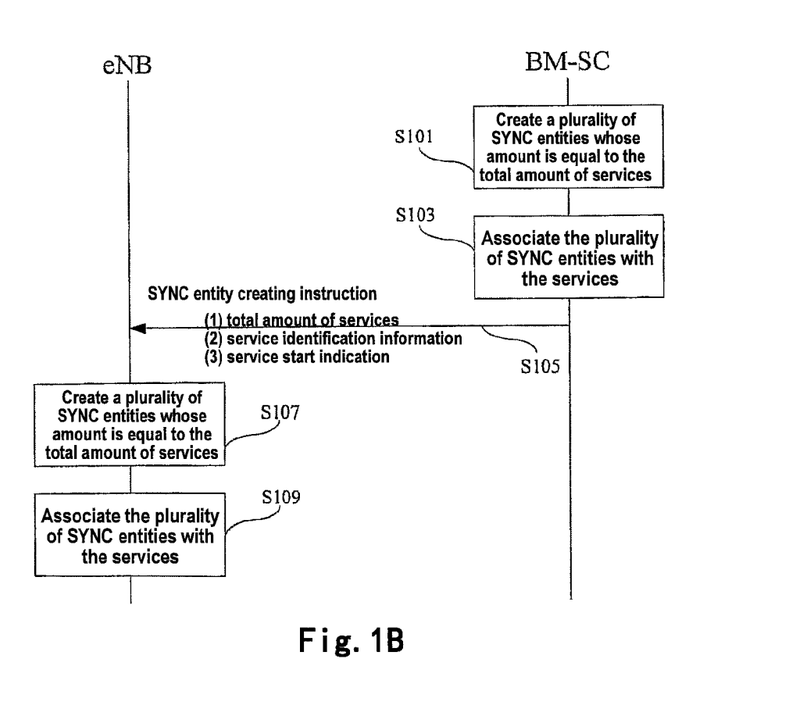
FIG. 1B illustrates an SYNC entity creating process according to Embodiment 1.
Figure 1C:
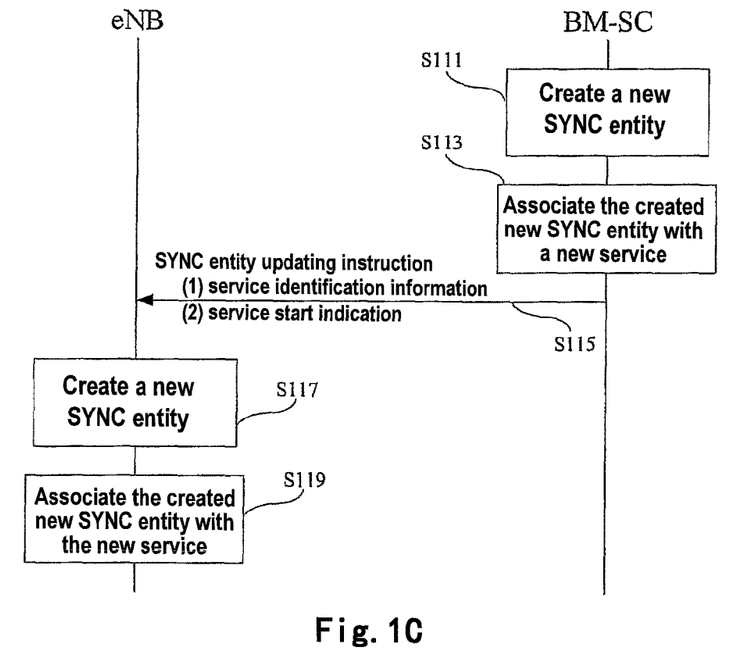
FIG. 1C illustrates an SYNC entity updating process according to Embodiment 1.
Figure 1D:
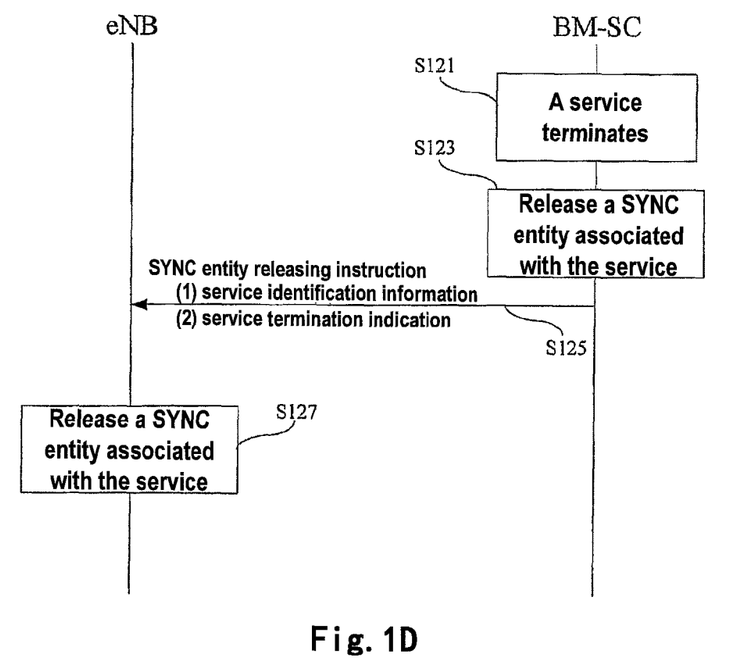
FIG. 1D illustrates an SYNC entity releasing process according to Embodiment 1.

FIGS. 1B-1D illustrate specific operation flows of Embodiment 1, including: an SYNC entity creating process, an SYNC entity updating process, and an SYNC entity releasing process.

FIG. 1B illustrates an SYNC entity creating process according to Embodiment 1. As illustrated in FIG. 1B, at step S101, the BM-SC creates a plurality of SYNC entities whose amount is equal to the total amount of services. At step S103, the BM-SC associates the created plurality of SYNC entities with the services in a one-to-one correspondence manner that each SYNC entity is associated with one service and each service is also associated with one SYNC entity. Then, at step S105, the BM-SC sends an SYNC entity creating instruction to eNBs within an MBSFN area, and the SYNC entity creating instruction may include total amount of services, service identification information, and service start indication. At step S107, the eNB creates a plurality of SYNC entities whose amount is equal to the total amount of services based on the received SYNC entity creating instruction. At step S109, the eNB associates the created plurality of SYNC entities with the services in a one-to-one correspondence manner that each SYNC entity is associated with one service and each service is also associated with one SYNC entity. In this way, the SYNC entity creating process is completed. This SYNC entity creating process generally occurs during the process of system initialization. When the system is in operation, while service change (a new service starts or the original service terminates) occurs during the operation, the SYNC entity updating process and the SYNC entity releasing process will be implemented.

FIG. 1C illustrates an SYNC entity updating process according to Embodiment 1. As illustrated in FIG. 1C, at step S111, when a new service starts, the BM-SC creates a new SYNC entity. At step S113, the BM-SC associates the created new SYNC entity with the new service in a one-to-one correspondence manner. Then, at step S115, the BM-SC sends an SYNC entity updating instruction to eNBs within an MBSFN area, and the SYNC entity updating instruction may include service identification information and service start indication. At step S117, the eNB creates a new SYNC entity based on the received SYNC entity updating instruction. At step S119, the eNB associates the created new SYNC entity with the new service in a one-to-one correspondence manner. In this way, the SYNC entity updating process for a new service is completed.

FIG. 1D illustrates an SYNC entity releasing process according to Embodiment 1. As illustrated in FIG. 1D, at step S121, the BM-SC detects termination of the original service. At step S123, the MB-SC releases the SYNC entity associated with the service. Then, at step S125, the BM-SC sends an SYNC entity releasing instruction to eNBs within an MBSFN area, and the SYNC entity releasing instruction may include service identification information and service termination indication. At step S127, the eNB releases the SYNC entity associated with the service based on the received SYNC entity release instruction. In this way, the SYNC entity releasing process for the original service is completed.

Embodiment 2

Service Multiplexing Group-Based SYNC Entities

Figure 2A:
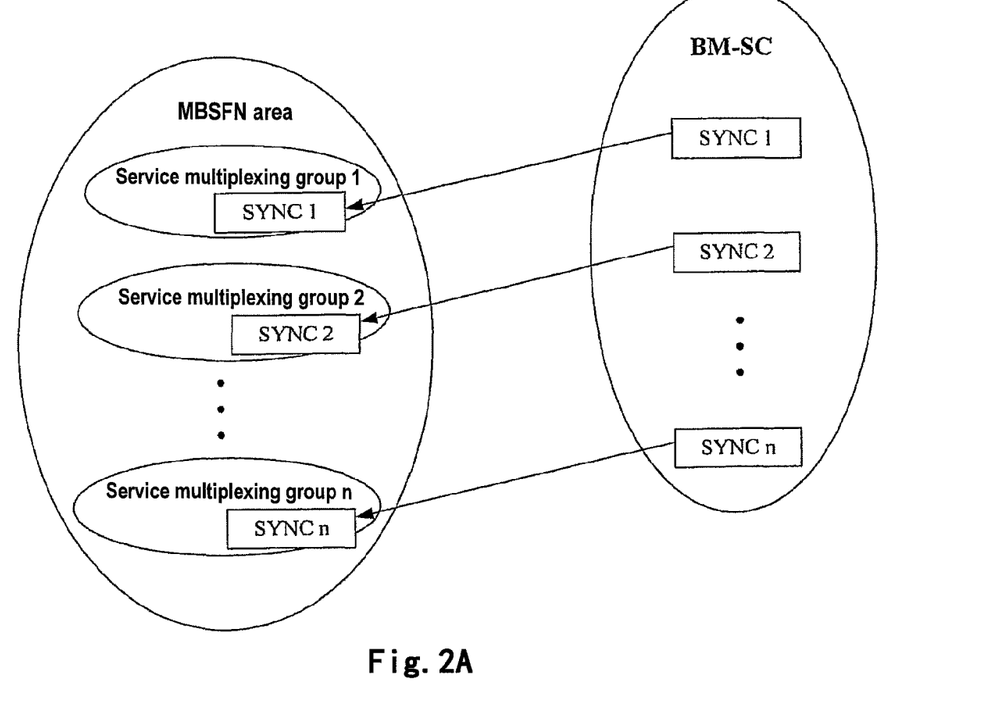
FIG. 2A illustrates a diagram of Embodiment 2 where SYNC entities are based on service multiplexing groups.

FIG. 2A illustrates a diagram of Embodiment 2 where SYNC entities are based on service multiplexing groups.

As illustrated in FIG. 2A, in Embodiment 2, the SYNC entities are based on service multiplexing groups, i.e., each service multiplexing group having a corresponding SYNC entity. Compared with Embodiment 1, the creating and releasing of SYNC entities in this embodiment is not so frequent, because only when all services in a service multiplexing group end, the SYNC entity relating to the service multiplexing group will be released. Embodiment 2 has the following advantages that the SYNC entities are initially designed to support service multiplexing (for example, the multiplexed service may be regarded as a virtual service); while the non-multiplexing instances may be regarded as special service multiplexing (i.e., each service is individually multiplexed). In Embodiment 2, additional information is needed to identify respective services in the same SYNC entity; or data packets for different services may be buffered and restructured in the BM-SC before transmission.

Generally, the advantages and drawbacks of Embodiment 2 are specified as below.

Advantages:
The multiplexed services are regarded as a virtual service, such that service multiplexing is more easily supported;
Low complexity, because start or termination of a single service in the service multiplexing group will not affect content synchronization of the service multiplexing group.

Drawbacks:
Additional information or BM-SC buffer is needed to identify different services in the service multiplexing group.

Figure 2B:
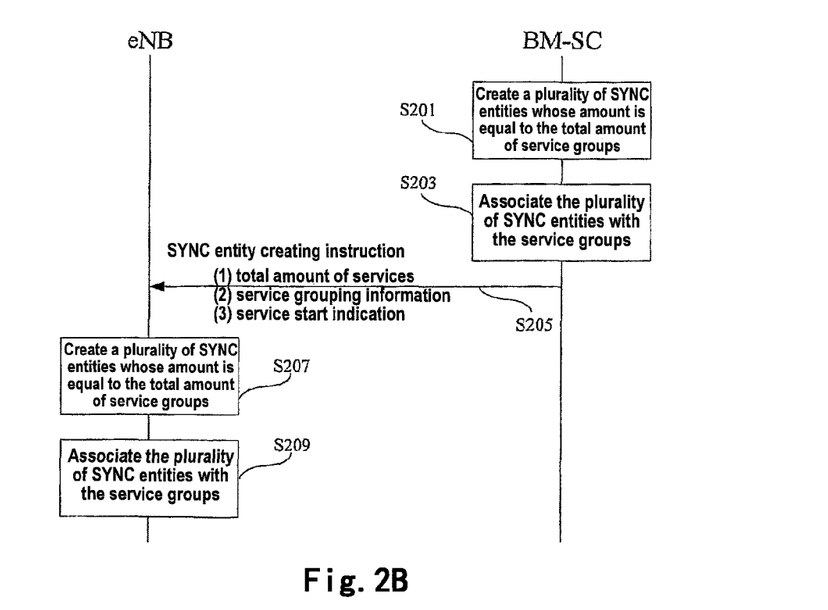
FIG. 2B illustrates an SYNC entity creating process according to Embodiment 2.
Figure 2C:
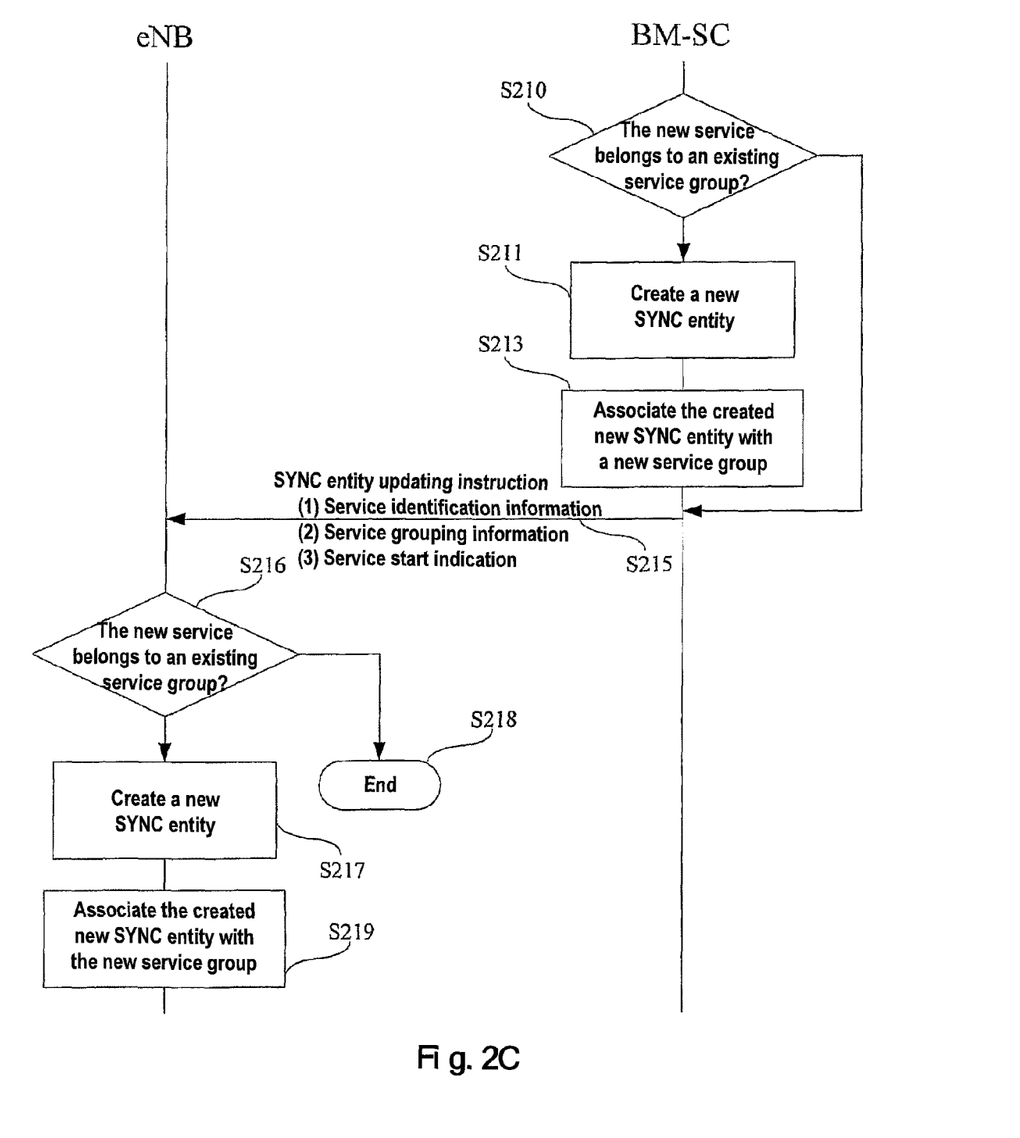
FIG. 2C illustrates an SYNC entity updating process according to Embodiment 2.
Figure 2D:
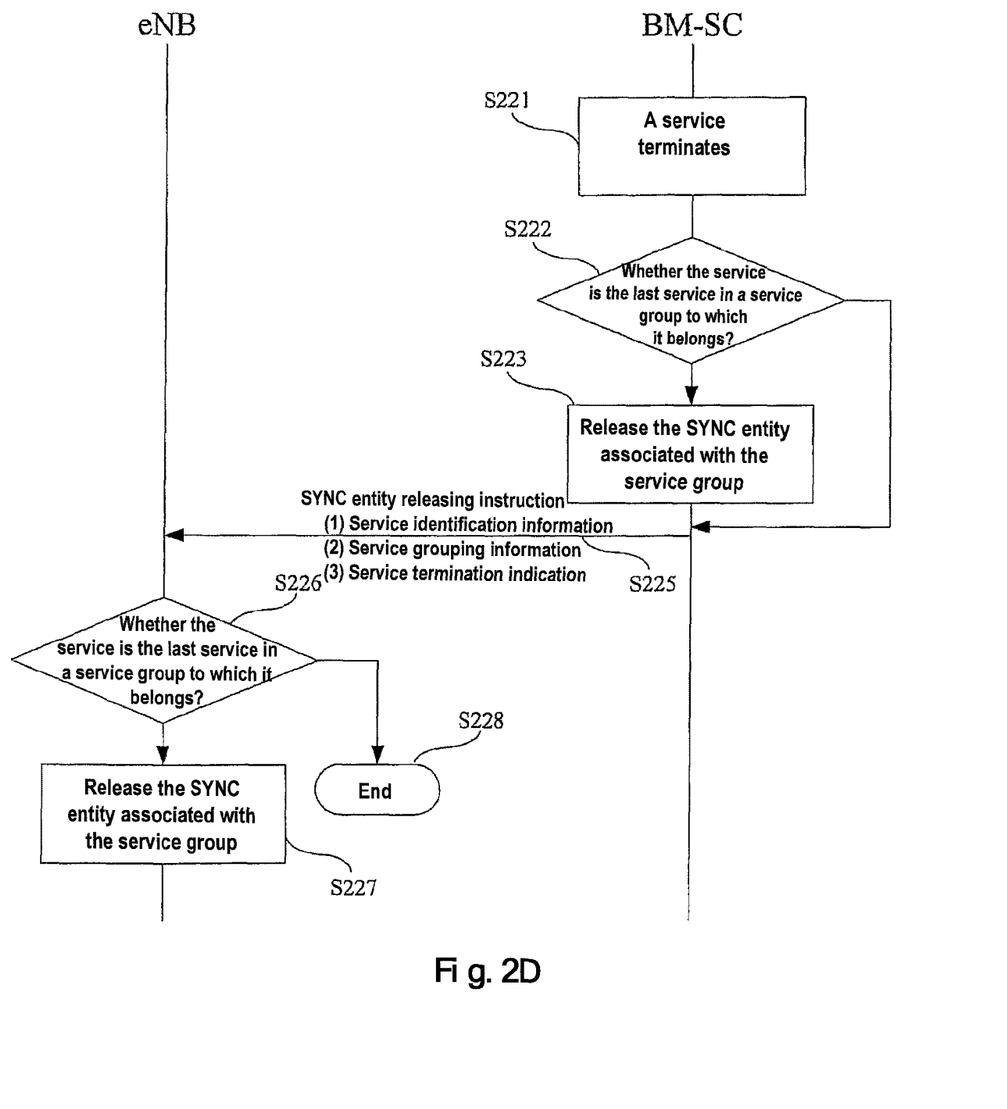
FIG. 2D illustrates an SYNC entity releasing process according to Embodiment 2.

FIGS. 2B-2D illustrate specific operation flows of Embodiment 2, including: an SYNC entity creating process, an SYNC entity updating process, and an SYNC entity releasing process.

FIG. 2B illustrates an SYNC entity creating process according to Embodiment 2. As illustrated in FIG. 2B, at step S201, the BM-SC creates a plurality of SYNC entities whose amount is equal to the total amount of service groups. At step S203, the BM-SC associates the created plurality of SYNC entities with the service groups in a one-to-one correspondence manner that each SYNC entity is associated with one service group and each service group is also associated with one SYNC entity. Then, at step S205, the BM-SC sends an SYNC entity creating instruction to eNBs within an MBSFN area, and the SYNC entity creating instruction may include total amount of services, service grouping information and service start indication. At step S207, the eNB creates a plurality of SYNC entities whose amount is equal to the total amount of service groups based on the received SYNC entity creating instruction. At step S209, the eNB associates the created plurality of SYNC entities with the service groups in a one-to-one correspondence manner that each SYNC entity is associated with one service group and each service group is also associated with one SYNC entity. In this way, the SYNC entity creating process is completed. This SYNC entity creating process generally occurs during the process of system initialization. When the system is in operation, while service change (a new service starts or the original service terminates) occurs during the operation, the SYNC entity updating process and the SYNC entity releasing process will be implemented.

FIG. 2C illustrates an SYNC entity updating process according to Embodiment 2. As illustrated in FIG. 2C, at step S210, when a new service starts, the BM-SC first determines whether the new service belongs to an existing service group. If the new service belongs to an existing service group (step S210: YES), the BM-SC directly performs step S215. On the other hand, if the new service does not belong to any existing service group (step S210: NO), the BM-SC creates a new SYNC entity at step S211. At step S213, the BM-SC associates the created new SYNC entity with the new service in a one-to-one correspondence manner. Then, at step S215, the BM-SC sends an SYNC entity updating instruction to eNBs within an MBSFN area, and the SYNC entity updating instruction may include service identification information, service grouping information, and service start indication. At step S216, the eNB first determines whether the new service belongs to an existing service group based on the received SYNC entity updating instruction. If the new service belongs to an existing service group (step S216: YES), the eNB needs not to perform any SYNC entity update operation; and at step S218, the SYNC entity updating operation is terminated. On the other hand, if the new service does not belong to any existing service group (step S216: NO), the eNB creates a new SYNC entity based on the received SYNC entity updating instruction at step S217. At step S219, the eNB associates the created new SYNC entity with the new service in a one-to-one correspondence manner. In this way, the SYNC entity updating process for a new service is completed.

FIG. 2D illustrates an SYNC entity releasing process according to Embodiment 2. As illustrated in FIG. 2D, at step S221, the BM-SC detects termination of an original service. At step S222, the BM-SC determines whether the original service is the last service in a service group to which it belongs. If the original service is not the last service in the service group to which it belongs (step S222: NO), the BM-SC directly performs step S225. On the other hand, if the original service is the last service in the service group to which it belongs (step S222: YES), the BM-SC releases the SYNC entities associated with the service group to which the original service belongs at step S223. Then, at step S225, the BM-SC sends an SYNC entity releasing instruction to eNBs within an MBSFN area, and the SYNC entity releasing instruction may include service identification information, service grouping information, and service termination indication. At step S226, the eNB first determines whether the original service is the last service in the service group to which it belongs based on the received SYNC entity releasing instruction. If the original service is not the last service in the service group to which it belongs (step S226: NO), the eNB needs not to perform any SYNC entity releasing operation, and at step S228, the SYNC entity releasing operation is terminated. On the other hand, if the original service is the last service in the service group to which it belongs (step S226: YES), the eNB releases the SYNC entities associated with the service group to which the original service belongs based on the received SYNC entity releasing instruction at step S227. In this way, the SYNC entity releasing process for the original service is completed.

During the above processes of creating, updating, and releasing the SYNC entities, additional information (service grouping information) is employed to identify different services in a service group. However, as previously mentioned, the buffering and restructuring manners may also be performed at the BM-SC without such additional information.

Embodiment 3

MBSFN Area-Based SYNC Entities

Figure 3A:
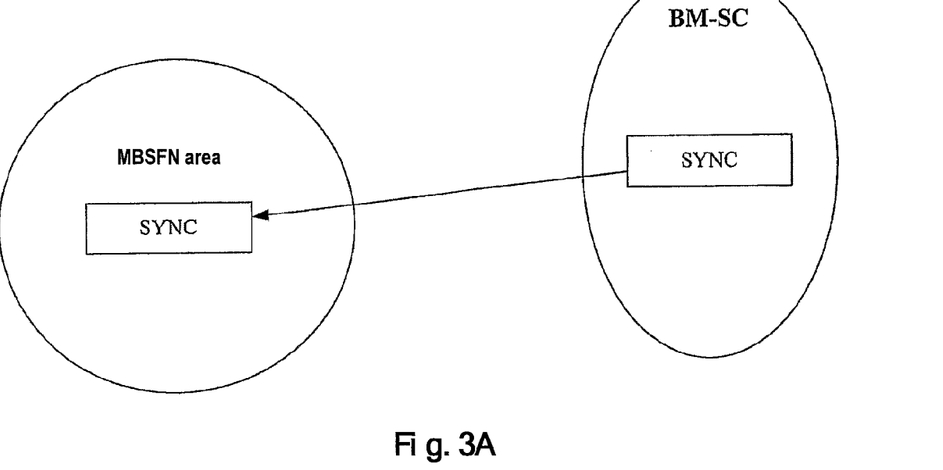
FIG. 3A illustrates a diagram of Embodiment 3 where SYNC entities are based on an MBSFN area.

FIG. 3A illustrates a diagram of Embodiment 3 where SYNC entities are based on an MBSFN area.

As illustrated in FIG. 3A, in Embodiment 3, there is only one SYNC entity in each MBSFN area, and the SYNC entity may be statically configured and will not be released all the way. It seems that Embodiment 3 is much simpler, but the fact is not so. Different services may be transmitted in different manners: multiplexing/non-multiplexing; some services having been terminated/some services being still ongoing. Because byte counting and packet counting are performed for all services together, the ongoing services might be affected by the already terminated services. In fact, the SYNC entities are not required to be shared between services whose transmissions are independent from one another. Thus, Embodiment 3 might be more complex in designing the SYNC mechanism.

Generally, the advantages and drawbacks of Embodiment 3 are specified as below.

Advantages:
There is only one SYNC entity and it will not be released all the way.

Drawbacks:
Rather complex, because it needs to consider unrelated services in a single SYNC algorithm;
Additional information or BM-SC buffer is needed so as to identify different services in a service multiplexing group.

Figure 3B:
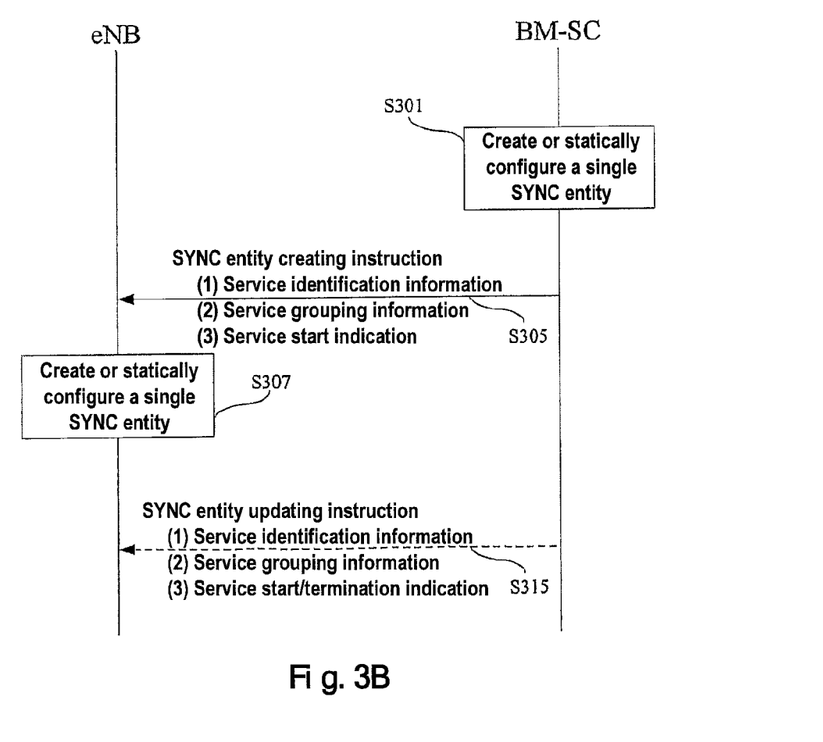
FIG. 3B illustrates a specific operation flow of Embodiment 3, including: an SYNC entity creating process and an SYNC entity updating process.

FIG. 3B illustrates a specific operation flow of Embodiment 3, including: an SYNC entity creating process and an SYNC entity updating process.

As illustrated in FIG. 3B, at step S301, the BM-SC creates or statically configures a single SYNC entity. Then, at step S305, the BM-SC sends an SYNC entity creating instruction to eNBs within an MBSFN area, and the SYNC entity creating instruction may include service identification information, service grouping information, and service start indication. At step S307, each eNB creates a single SYNC entity based on the received SYNC entity creating instruction. In this way, the SYNC entity creating process is completed. This SYNC entity creating process generally occurs during the process of system initialization. When the system is in operation, while service change (a new service starts or the original service terminates) occurs during the operation, the SYNC entity updating process will be implemented.

Still referring to FIG. 3B, as illustrated by the dotted line in FIG. 3B, because Embodiment 3 does not relate to release of the SYNC entity, only the SYNC entity updating process is performed for either start of a new service or termination of an original service. During the SYNC entity updating process (step S315), the BM-SC sends an SYNC entity updating instruction to eNBs within an MBSFN area, and the SYNC entity updating instruction may include service identification information, service grouping information, and service start indication (or service termination indication). In this way, the SYNC entity updating process is completed.

During the above processes of creating and updating the SYNC entities, additional information (service grouping information) is employed to identify different services in a service group. However, as previously mentioned, the buffering and restructuring manners may also be performed at the BM-SC without such additional information.

Figure 4:
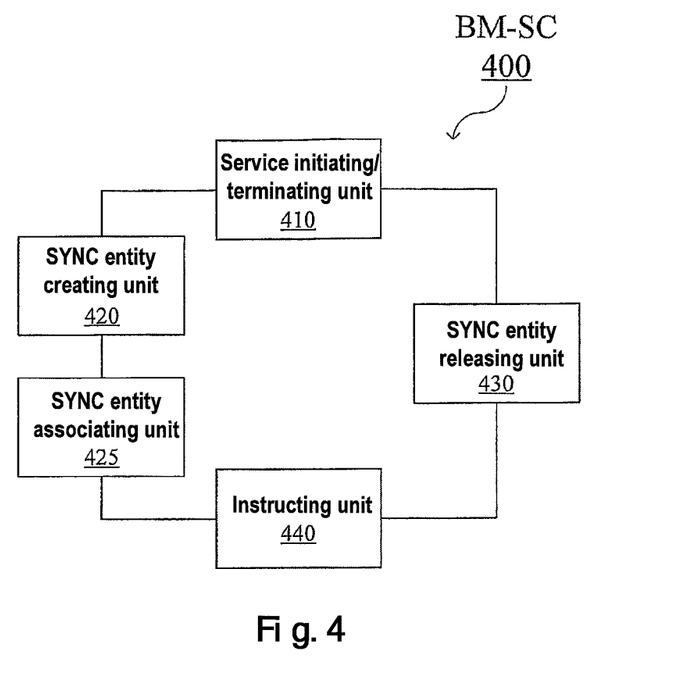
FIG. 4 illustrates a structural block diagram of a BM-SC configured to implement the processes of creating, updating, and releasing the SYNC entities.

FIG. 4 illustrates a structural block diagram of a BM-SC configured to implement processes of creating, updating, and releasing the SYNC entities. It should be noted that, for the sake of simplicity, FIG. 4 illustrates all components that might be needed during respective processes. However, for any single process, not all these components are necessary. Those skilled in the art may, as required, select, abandon, or combine these illustrated components for different processes in different embodiments as implemented.

As illustrated in FIG. 4, the BM-SC 400 according to the present invention includes a service initiating/terminating unit 410 configured to determine whether a new service starts or whether an original service terminates (S111, S121, S210, S221); an SYNC entity creating unit 420 configured to create SYNC entities, which may be created (S101, S111, S201, S210, S211) based on services or service groups or may be created independent of the services or service groups (S301); an SYNC entity associating unit 425 configured to associate the SYNC entities created by the SYNC entity creating unit 420 with the services or service groups (S103, S113, S203, S213); an SYNC entity releasing unit 430 configured to release an SYNC entity (S123, S222, S223) based on services or service groups; and an instructing unit 440 configured to send SYNC entity creating instruction, SYNC entity updating instruction, or SYNC entity releasing instruction (S105, S115, S125, S205, S215, S225, S305, S315) to all eNBs within an MBSFN area.

Figure 5:
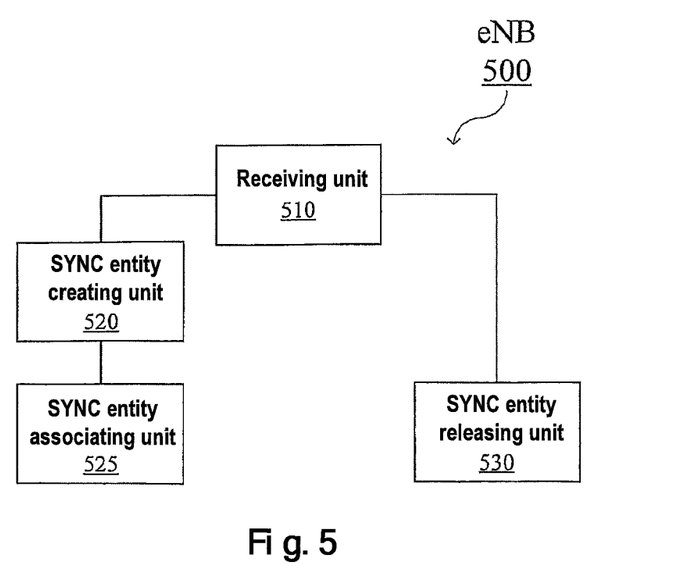
FIG. 5 illustrates a structural block diagram of an eNB configured to implement the processes of creating, updating, and releasing the SYNC entities.

FIG. 5 illustrates a structural block diagram of an eNB configured to implement the processes of creating, updating, and releasing the SYNC entities. It should be noted that, for the sake of simplicity, FIG. 5 illustrates all components that might be needed during respective processes. However, for any single process, not all these components are necessary. Those skilled in the art may, as required, select, abandon, or combine these illustrated components for different processes in different embodiments as implemented.

As illustrated in FIG. 5, the eNB 500 according to the present invention includes a receiving unit 510 configured to receive SYNC entity creating instruction, SYNC entity updating instruction, or SYNC entity releasing instruction (S105, S115, S125, S205, S215, S225, S305, S315) from an BM-SC; an SYNC entity creating unit 520 configured to create SYNC entities, which may be created (S107, S117, S207, S216, S217) based on services or service groups or be created independent of services or service groups (S307); an SYNC entity associating unit 525 configured to associate the SYNC entities created by the SYNC entity creating unit 520 with the services or service groups (S109, S119, S209, S219); and an SYNC entity releasing unit 530 configured to release SYNC entities (S127, S226, S227) based on the services or service groups.

The above embodiments are only for exemplary purposes, not intended to limit the present invention. A person of normal skill in the art should understand that various modifications and substitutions to the embodiments are allowed without departing from the scope and spirit of the present invention, and these modifications and substitutions fall within the scope as limited by the appended claims.

What is claimed is:

1. A method of operating a Broadcast Multicast Service Center (BM-SC), the method comprising:
    creating, at the BM-SC, a plurality of synchronization entities whose amount is equal to a total amount of services;
    associating the synchronization entities with the services in a one-to-one correspondence manner;
    transmitting synchronization entity creating instructions or synchronization entity updating instructions to all base stations within a Multicast Single Frequency Network (MBSFN) area.

2. The method of claim 1, further comprising:
    determining, at the BM-SC, whether a new service starts or whether an original service terminates; and
    releasing, at the BM-SC, synchronization entities based on services or service groups,
    wherein when it is determined that a new service starts, synchronization entities are created, and
    wherein, when it is determined that an original service terminates, synchronization entities, created at the BM-SC, are released and a synchronization entity releasing instruction is sent to all base stations within the MBSFN area.

3. A method of operating a base station within a Multimedia Broadcast Single Frequency Network (MBSFN) area, the method comprising:
    receiving synchronization entity creating instructions or synchronization entity updating instructions at a base station within the MBSFN area;
    creating, at the base station, based on the received synchronization entity creating instructions or synchronization entity updating instructions, synchronization entities whose amount is equal to a total amount of service groups; and
    associating the created synchronization entities with the service groups in a one-to-one correspondence manner.

4. The method according to claim 3, further comprising:
    receiving a synchronization entity releasing instructions from the BM-SC, and
    releasing synchronization entities based on the services or the service groups.

5. The method according to claim 3, wherein the method is performed on all base stations within the MBSFN area.

6. A base station comprising:
    a receiving unit configured to receive a synchronization entity creating instruction from a Broadcast Multicast Service Center (BM-SC), wherein the synchronization entity creating instruction includes an amount of total services, services identification information, and a service start indication;
    a synchronization entity creating unit configured to create a plurality of synchronization entities whose amount is equal to the total amount of services based on the received synchronization entity creating instruction; and
    a synchronization entity associating unit configured to associate the synchronization entities created by the synchronization entity creating unit with the services in a one-to-one correspondence manner.

7. The base station of claim 6, wherein:
    the receiving unit is further configured to receive the synchronization entity releasing instruction from the BM-SC, and
    the base station further comprises a synchronization entity releasing unit configured to release synchronization entities based on the services.

8. A Broadcast Multicast Service Center (BM-SC) comprising:
    a synchronization entity creating unit configured to create a plurality of synchronization entities whose amount is equal to a total amount of services;
    a synchronization entity associating unit configured to associate the created plurality of synchronization entities with the services in a one-to-one correspondence manner; and
    instructing unit configured to transmit a synchronization entity creating instruction or a synchronization entity updating instruction to all base stations within a Multimedia Broadcast Multicast Single Frequency Network (MBSFN) area.

9. The BM-SC according to claim 8, further comprising:
    a service initiating/terminating unit configured to determine whether a new service starts or whether an original service terminates; and
    a synchronization entity releasing unit configured to release synchronization entities based on services or service groups,
    wherein when it is determined that a new service starts, the service initiating/terminating unit instructs the synchronization entity creating unit to create synchronization entities, and
    when it is determined that an original service terminates, the service initiating/terminating unit instructs the synchronization entity releasing unit to release a synchronization entity, created at the BM-SC, and the instructing unit is further configured to transmit a synchronization entity releasing instruction to all base stations within the MBSFN area.

* * * * *